(12) United States Patent
Harmuth et al.

(10) Patent No.: US 9,428,421 B2
(45) Date of Patent: Aug. 30, 2016

(54) METHOD FOR PRODUCING A REFRACTORY MATERIAL BASED ON MAGNESIA OR MAGNESIA SPINEL, AND REFRACTORY MATERIAL BASED ON MAGNESIA OR MAGNESIA SPINEL

(71) Applicant: REFRACTORY INTELLECTUAL PROPERTY GMBH & CO. KG, Vienna (AT)

(72) Inventors: Harald Harmuth, Leoben (AT); Sabine Gschiel, Leoben (AT); Zoltan Lences, Bratislava (SK); Pavol Sajgalik, Bratislava (SK)

(73) Assignee: REFRACTORY INTELLECTUAL PROPERTY GMBH & CO. KG, Vienna (AT)

( * ) Notice: Subject to any disclaimer, the term of this patent is extended or adjusted under 35 U.S.C. 154(b) by 0 days.

(21) Appl. No.: 14/441,885

(22) PCT Filed: Sep. 26, 2013

(86) PCT No.: PCT/EP2013/070044
§ 371 (c)(1),
(2) Date: May 11, 2015

(87) PCT Pub. No.: WO2014/075840
PCT Pub. Date: May 22, 2014

(65) Prior Publication Data
US 2015/0284293 A1    Oct. 8, 2015

(30) Foreign Application Priority Data
Nov. 13, 2012    (EP) .................................... 12192453

(51) Int. Cl.
*C04B 35/03*    (2006.01)
*C04B 35/04*    (2006.01)
(Continued)

(52) U.S. Cl.
CPC ......... *C04B 35/043* (2013.01); *C04B 35/0435* (2013.01); *C04B 35/6303* (2013.01); *C04B 35/6316* (2013.01); *C04B 35/645* (2013.01); *C04B 2235/322* (2013.01); *C04B 2235/3206* (2013.01); *C04B 2235/3208* (2013.01); *C04B 2235/3217* (2013.01); *C04B 2235/3218* (2013.01); *C04B 2235/3222* (2013.01); *C04B 2235/3865* (2013.01); *C04B 2235/3869* (2013.01); *C04B 2235/3873* (2013.01); *C04B 2235/428* (2013.01); *C04B 2235/5436* (2013.01);
(Continued)

(58) Field of Classification Search
CPC ... C04B 35/443; C04B 35/04; C04B 35/043; C04B 35/0435
USPC ................. 501/108, 118, 119, 120, 121, 122
See application file for complete search history.

(56) References Cited

U.S. PATENT DOCUMENTS

2012/0231243 A1\* 9/2012 Watanabe ............. C04B 35/581
428/212

FOREIGN PATENT DOCUMENTS

WO    92/22517 A1    12/1992

OTHER PUBLICATIONS

International Search Report for App. No. PCT/EP2013/070044 mailed Oct. 29, 2013.

*Primary Examiner* — Noah Wiese
(74) *Attorney, Agent, or Firm* — Walker & Jocke

(57) ABSTRACT

The invention relates to a method for producing a refractory material based on magnesia or magnesia spinel, and to a refractory material based on magnesia or magnesia spinel.

14 Claims, 5 Drawing Sheets

(51) Int. Cl.
*C04B 35/043* (2006.01)
*C04B 35/63* (2006.01)
*C04B 35/645* (2006.01)

(52) U.S. Cl.
CPC .... *C04B 2235/5472* (2013.01); *C04B 2235/77* (2013.01); *C04B 2235/80* (2013.01); *C04B 2235/96* (2013.01)

METHOD FOR PRODUCING A REFRACTORY MATERIAL BASED ON MAGNESIA OR MAGNESIA SPINEL, AND REFRACTORY MATERIAL BASED ON MAGNESIA OR MAGNESIA SPINEL

The invention relates to a method for producing a refractory material based on magnesia or magnesia spinel and to a refractory material based on magnesia or magnesia spinel.

The term "refractory material" within the meaning of the invention in particular denotes ceramic products with a working temperature of over 600° C. and preferably refractory materials according to DIN 51060, in other words materials with a Seger cone drop point greater than SK17.

Refractory materials in the shape of formed refractory products, in other words bricks, for example, and unformed refractory products, so in particular refractory concrete, refractory masses and also refractory mortars.

Refractory materials are based in particular on ceramic raw materials which particularly also include magnesia (magnesium oxide, MgO) and magnesia spinel (magnesium aluminate, $MgO.Al_2O_3$, $MgAl_2O_4$).

Refractory materials based on magnesia or magnesia spinel are characterized by good refractory properties. For certain applications it would be desirable, however, to make available materials based on magnesia or magnesia spinel with improved refractory properties. For example, for numerous applications of refractory materials based on magnesia or magnesia spinel, an improvement in strength, a reduction in brittleness and an improvement in corrosion resistance and in oxidation and infiltration resistance would be desirable.

In the past, there has therefore been no shortage of attempts to provide refractory materials based on magnesia or magnesia spinel with improved refractory properties.

For example, U.S. Pat. No. 4,557,884 describes to this extent a method for producing a refractory material based on magnesia in which a binding phase is formed from a magnesium SiAlON polytype during firing.

The problem addressed by the invention is that of providing a method by means of which a refractory material based on magnesia or magnesia spinel with improved refractory properties, in particular with outstanding strength, corrosion resistance, oxidation resistance and infiltration resistance and also low brittleness, can be produced. A further problem addressed by the invention is that of providing a refractory material based on magnesia or magnesia spinel with properties of this kind.

In order to solve the first problem mentioned above, a method for producing a refractory material based on magnesia or magnesia spinel is provided comprising the following steps:

provision of a batch comprising
i. a first component made of at least one of the following materials: magnesia or magnesia spinel;
ii. a second component comprising substances by means of which a binding phase comprising an AlN polytypoid can be formed when temperature is applied;
application of temperature to the batch within a temperature range in which the second component forms a binding phase comprising an AlN polytypoid; wherein the batch is exposed to pressure during the application of temperature in this temperature range.

The invention is based on the idea of producing a refractory material based on magnesia or magnesia spinel in that grains of magnesia or magnesia spinel are bonded or sintered by a binding phase which comprises an AlN polytypoid.

Surprisingly, it has now emerged in the context of the invention that numerous properties of refractory materials produced in this way can only be improved in a sustainable manner if the raw materials of the refractory material are exposed to pressure during ceramic firing. In particular, refractory properties in respect of the strength, corrosion resistance, brittleness and oxidation resistance and infiltration resistance of refractory materials based on magnesia or magnesia spinel which exhibit a binding phase comprising an AlN polytypoid can be substantially improved if these materials are exposed to pressure during ceramic firing.

"Polytype" refers to a substance that occurs in a plurality of different structural modifications, each of which is formed from stacks of layers with a substantially identical structure and composition, wherein the modifications only differ in terms of their stacking sequence. "Polytypoid" denotes a substance in the form of a polytype which does not conform to this strict definition; instead, polytypoids also include minerals with the same typology or with a slightly different composition. According to the established definition, polytypes exist when, if there is any slight deviation in chemical composition, the stacking sequence of the layers differs by no more than 0.25 apfu (atoms per formula unit) of an arbitrary component unit. If the stacking sequence of the layers differs by more than this 0.25 apfu, this is referred to as a polytypoid (see also in this respect [1] Nickel E. H., Girce J. D.: "The IMA commission on new minerals and mineral names: Procedures and guidelines on mineral nomenclature, 1998". The Canadian Mineralogist, Vol. 36 (1998); [2] Bailey S. W. et al: "Report of the international mineralogical association (IMA)—international union of crystallography (IUCr) joint committee on nomenclature". Canadian Mineralogist, Vol. 16 pp 113-117 (1978)).

According to the invention, one of the two following AlN polytypoids is provided in the refractory material according to the invention as the AlN polytypoid or the second component comprises substances by means of which a binding phase can be formed when temperature is applied, which binding phase comprises one of the following two AlN polytypoids: AlN polytypoid consisting of the elements Mg, Al, O and N (hereinafter referred to as a "MgAlON phase", "MgAlON—AlN polytypoid" or "MgAlON polytypoid") or AlN polytypoid consisting of the elements Mg, Si, Al, O and N (hereinafter referred to as a "MgSiAlON phase" or "MgSiAlO—AlN polytypoid" or "MgSiAlON polytypoid").

When the method according to the invention is implemented, a batch is initially supplied comprising the raw materials or components which constitute the precursors for production of the refractory material using the method according to the invention.

In order to improve the homogeneity of the batch, it may be provided that it is mixed, for example by an attritor, a roller mixer or a forced mixer, for example a forced mixer made by the company Gustav Eirich GmbH & Co KG, Hardheim, Germany.

Insofar as a refractory material in the shape of a formed product is to be produced using the method according to the invention, the batch may be formed, in particular by pressing. It may be provided in this case that a binding agent is added to the batch, in particular a temporary binding agent such as isopropanol, for example. The batch formed into a green body can then be dried, for example at a temperature in the range of 80-120° C.

The batch, possibly formed into a green body, is then exposed to temperature. According to the invention, the batch is also exposed to temperature during the temperature application in a temperature range of this kind, in which the substances of the second component of the batch form a binding phase comprising an AlN polytypoid. Temperature application in this range is usually referred to as ceramic firing, as in this case too. The binding phase produced during ceramic firing causes the substances of the first component, in other words granular products in the form of magnesia and/or magnesia spinel, to be bound or sintered to one another. The temperature range in which the substances of the second component form a binding phase comprising an AlN polytypoid during ceramic firing depends on the composition of the batch in each case and, in particular, on the composition of the second component of the batch in each case. It has emerged according to the invention that a binding phase comprising an AlN polytypoid can be formed in particular at temperatures above 1200° C. from substances from which a binding phase comprising an AlN polytypoid can be formed during exposure, so that it can be particularly provided according to the invention that the batch is exposed to a temperature of at least 1200° C., 1300° C. or 1400° C. In addition, it may be provided according to the invention that the batch is exposed to a temperature of no more than 1800° C., so for example not even a temperature of over 1750° C., 1700° C. or 1650° C. The batch is particularly preferably exposed to temperature in the temperature range from 1400° C. to 1650° C., in order to form a binding phase comprising an AlN polytypoid from the substances of the second component.

While the batch is being exposed to temperature it may additionally have a gas comprising nitrogen ($N_2$) applied to it or exposure of the batch to temperature may take place in a nitrogen atmosphere. The batch may be exposed to temperature in a nitrogen atmosphere for all or part of the duration in which the batch is exposed to temperature. In particular, exposure of the batch to temperature in a nitrogen atmosphere may take place for the duration in which the batch is exposed to temperature in a temperature range in which the second component forms a binding phase comprising an AlN polytypoid. As explained in greater detail below, exposure of the batch to temperature in a nitrogen atmosphere, particularly during ceramic firing, may be necessary in order to nitrate the batch.

Exposure of the batch to temperature in a temperature range within which the substances of the second component form a binding phase comprising an AlN polytypoid may take place over a duration within which the substances of the second component have formed a binding phase comprising an AlN polytypoid to the desired extent. For example, exposure of the batch to temperature within this temperature range may take place over a duration of at least 60 minutes, so for example also over a duration of at least 90 or 120 minutes. In addition, exposure of the batch to temperature in this temperature range may take place for a maximum of 600 minutes, so for example also over a duration of maximum 400, 300, 240, 210 or 180 minutes. Particularly preferably, the batch is exposed to temperature within a temperature range in which the substances of the second component form a binding phase comprising an AlN polytypoid for a duration in the region of 60-180 minutes.

As previously stated, it is provided for according to the invention that during exposure to temperature within this temperature range in which the substances of the second component form a binding phase comprising an AlN polytypoid, the batch is additionally exposed to pressure.

The batch may be exposed to pressure for all or part of the period over which the batch is exposed to temperature within this temperature range. In other words, according to the invention the batch is exposed to pressure during ceramic firing. The pressure applied to the batch during ceramic firing is significantly higher than normal pressure, in particular preferably above 1 MPa (megapascal). The batch is particularly preferably exposed to a pressure of at least 2, 4, 6, 8 or 10 MPa during ceramic firing. In addition, it may be provided that the batch is exposed to a pressure of maximum 50 MPa, so for example also to a pressure of maximum 40, 35 or 30 MPa. Particularly preferably, the batch is exposed during ceramic firing according to the invention to a pressure in the range of 10-30 MPa.

Once the batch has been exposed accordingly to temperature and pressure, the fired batch is cooled off. After cooling, the refractory material is produced from the batch.

Different technologies are known from the state of the art, by means of which batches can be exposed to pressure during ceramic firing. These technologies may also be applied during implementation of the present method, in order to expose the batch to pressure during ceramic firing. Corresponding technologies are, for example, isostatic or uniaxial hot-pressing. Hot-pressing of this kind may, for example, be carried out in a graphite mould, as is known from the state of the art.

The batch comprises in terms of components at least a first component and also a second component. The first component preferably takes the form of a rough fraction and has at least one of the following components, preferably in granular form: magnesia or magnesia spinel. The second component is preferably in the form of a fine fraction and exists in the form of such substances that a binding phase comprising an AlN polytypoid can be formed from these when temperature is applied.

The second component comprises a plurality of substances. The composition of the second component from these substances in this case is such that a binding phase comprising an AlN polytypoid can be formed by the second component when temperature is applied to the batch. During ceramic firing of the batch, the second component therefore forms a binding phase which comprises AlN polytypoid.

The specific selection of substances that make up the second component is possible to this extent within a broad spectrum and is easily realizable for the person skilled in the art. It is crucial to the success of the invention that the second component comprises substances that form a binding phase which comprises an AlN polytypoid during ceramic firing.

As is generally known, an AlN polytypoid in the form of a MgAlON polytypoid comprises the elements magnesium (Mg), aluminium (Al), oxygen (O) and nitrogen (N). It is provided according to one embodiment that the second component comprises substances which each comprise at least one of the aforementioned elements.

In order to form an AlN polytypoid in the form of a MgAlON polytypoid in the binding phase during ceramic firing upon implementation of the method according to the invention, the second component may therefore comprise at least one of the following substances, for example: MgO, $MgAl_2O_4$, $Al_2O_3$, Al, AlN or AlON. The second component preferably always comprises AlN as substance, as it has been found according to the invention that this substance is highly advantageous to the formation of a MgAlON polytypoid in the binding phase. According to a preferred embodiment, the second component comprises MgO (for example 25-98% by mass), AlN (for example 1-45% by mass) and $Al_2O_3$ (for example 2-40% by mass). According to another preferred embodiment, the second component comprises the substances $MgAl_2O_4$ (for example 4-95% by mass, AlN (for example 1-45% by mass) and MgO (for example 1-95% by mass. The above figures in % by mass each relate to the fraction of the substance in question relative to the total mass of the binding phase.

As is generally known, an AlN polytypoid in the form of a MgSiAlON polytypoid comprises the elements magnesium (Mg), silicon (Si), aluminium (Al), oxygen (O) and nitrogen (N). According to one embodiment, it is provided that the second component comprises substances which each comprise at least one of the aforementioned elements.

In order to form a MgSiAlON polytypoid in the binding phase during ceramic firing when implementing the method according to the invention, the second component may therefore comprise at least one of the following substances, for example: MgO, $MgAl_2O_4$, $Al_2O_3$, Al, AlN, AlON, Si, $Si_3N_4$ or $SiO_2$. The second component preferably always comprises AlN as substance, as it was found according to the invention that this substance is highly advantageous to the formation of a MgSiAlON polytypoid in the binding phase. According to a preferred embodiment, the second component comprises the following substances: MgO (for example 20-45% by mass), $Si_3N_4$ (for example 10-35% by mass), $Al_2O_3$ (for example 10-40% by mass) and AlN (for example 10-40% by mass). According to another preferred embodiment, the second component comprises the following substances: MgO (for example 20-45% by mass), $Si_3N_4$ (for example 3-7% by mass), $Al_2O_3$ (for example 10-40% by mass), AlN (for example 10-40% by mass) and Si (for example 8-20% by mass). The above fractions in % by mass relate to fractions of the respective substances relative to the total mass of the second component.

Taken cumulatively, the compositions referred to in the aforementioned exemplary embodiments may comprise for the second component $MgAl_2O_4$ (for example in fractions of 1-50% by mass relative to the total mass of the second component). The advantage of a second component comprising $MgAl_2O_4$ is in particular that the presence of $MgAl_2O_4$ in the second component means that the unwanted formation of forsterite in the binding phase can be suppressed during temperature application. The aforementioned fractions in % by mass relate to the fractions of the respective substances relative to the second component.

According to one embodiment, it is provided for the batch to be nitrated during the temperature application, in particular during ceramic firing. This nitration may in particular be carried out in that during temperature application the batch is additionally exposed to a gas comprising nitrogen ($N_2$). Since notable nitration of the aluminium (Al) or of a substance comprising aluminium of the second component starts from 950° C. (formation of AlN) and in particular from 1200° C. (formation of an AlN polytypoid), it may be particularly provided according to the invention that the batch is nitrated with a temperature application above 950° C. and in particular above 1200° C. Methods of nitrating batches for the production of refractory materials are known from the state of the art, which means that reference can be made to these methods (see also in this respect [1] Wang X., Wang H., Zhang B., Hong Y., Sun J.: "Synthesis mechanism of MgAlON in nitridation reaction process". Rare Metal Materials and Engineering, Vol. 34 [1], pp 42-45 (2005) Wang X. T.; [2] Wang H. Z., Zhang W. J., Sun J., Hong Y. R.: "Synthesis of MgAlON from Al—Al2O3-MgO by Reaction Sintering". Key Engineering Materials, Vol. 224-226, pp 373-378 (2002); [3] Wang X., Zhang W., Wang H.: "Nitridation reaction sintering behaviour of Al—Al2O3-MgO system". Naihuo Cailiao, Vol. 35 [6], pp 317-319 (2001)).

This kind of nitration of the batch may in particular be provided for when the substances of the second component comprise no nitrogen-comprising substances or the substances of the second batch do not provide nitrogen for the formation of a MgSiAlON polytypoid or a MgAlON polytypoid in the binding phase in a desired quantity.

The second component preferably comprises the aforementioned substances exclusively or at least predominantly. According to one embodiment, it is provided that the second component exhibits alongside the aforementioned substances further substances in a fraction of under 10% by mass, so for example also in a fraction of under 5 or under 2 or under 1% by mass, relative to the total mass of the second component in each case.

According to a particularly preferred embodiment, the second component in the batch supplied, in other words prior to temperature application and, in particular, prior to ceramic firing, comprises no AlN polytypoid, in other words no MgAlON polytypoid and no MgSiAlON polytypoid. Instead, it may be provided according to the invention that a MgAlON polytypoid or a MgSiAlON polytypoid is formed exclusively during temperature application in situ by the second component in the binding phase. It has emerged according to the invention that by virtue of this kind of in-situ formation of a MgAlON polytypoid or a MgSiAlON polytypoid during ceramic firing, a refractory material with improved refractory properties can be formed compared with a refractory material in which the batch already comprises a MgAlON polytypoid or a MgSiAlON polytypoid before ceramic firing is carried out. A further advantage of the in-situ formation of a MgAlON polytypoid or a MgSiAlON polytypoid during ceramic firing is that energy can be saved in this way, as a MgAlON polytypoid or a MgSiAlON polytypoid does not have to be produced beforehand in a separate firing process.

According to an alternative embodiment, the second component in the batch supplied, in other words before temperature application and, in particular, before ceramic firing, already comprises a MgAlON polytypoid or a MgSiAlON polytypoid.

It is important to the success of the invention for the first component and the second component to be present in the batch in a different grain size, wherein the first component forms a coarse fraction and the second component a fine fraction. To this extent, the first component is present in a coarser grain size than the second component or else the mean grain size of the first component is greater than the mean grain size of the second component.

According to an exemplary embodiment, it may be provided that at least 90% by mass, so for example also at least 95, 98 or 99% by mass or also 100% by mass of the second component exhibits a grain size of under 63 μm, relative to the total mass of the second component in each case. It may be provided that the $D_{50}$ value of the second component lies within the range of 0.1-15 μm. Insofar as the second component comprises a substance in the form of silicon (silicon powder) for the formation of a MgSiAlON polytypoid in the binding phase, it may be provided that the $D_{50}$ value falls within the range of 0.1-4 μm for substances of the second component, with the exception of silicon; the $D_{50}$ value for silicon may fall within the range of 5-20 μm, for example.

It may be provided, for example, that at least 90% by mass, so for example also at least 95, 98 or 99% by mass or also 100% by mass of the first component exhibits a grain size of no less than 63 μm. According to a further aspect of the invention, it may be provided that at least 30% by mass, so for example also at least 35, 40, 50, 60, 70, 80, 90% by mass or also 100% by mass, of the first component is present in a grain size of no less than 1 mm. The aforementioned figures in % by mass relate in each case to the total mass of the first component.

Insofar as the second component comprises substances from which a binding phase comprising a MgAlON polytypoid can be formed with the application of temperature, the first component may be present within the range of grain sizes of 0.063-1 mm, 1-3 mm and 3-5 mm in the range of the following fractions by mass, relative to the total mass of the first component in each case:

>3-5 mm: at least 10% by mass, maximum 30 or 40% mass;
>1-3 mm: at least 20% by mass, maximum 70 or 80% by mass;
0.063-1 mm: 0 or at least 1% by mass, maximum 55% by mass.

Insofar as the second component comprises substances from which a binding phase comprising a MgSiAlON polytypoid can be formed with the application of temperature, the first component may be present in the range of grain sizes of 0.063-0.1 mm, 0.1-1 mm and 1-3 mm and 3-5 mm in the range of the following fractions by mass, relative to the total mass of the first component in each case:

>3-5 mm: at least 14 or 18% by mass, maximum 50 or 60% mass;
>1-3 mm: at least 5% by mass, maximum 70 or 80% by mass; >0.1-1 mm: 0 or at least 1% by mass, maximum 652 or 55 5 by mass;
0.063-1 mm: 0 or at least 1% by mass, maximum 30 or 35% by mass.

Insofar as the second component comprises substances from which a binding phase comprising a MgSiAlON polytypoid can be formed with the application of temperature, the first component may generally be present within the range of the grain size of 0.063-1 mm within the range of the following mass fractions, relative to the total mass of the first component:

0.063-1 mm: 0 or at least 1% by mass, maximum 52, 55, 57 or 60% by mass. The above values may apply to a grain size in the region >1 mm.

The first component comprises the substances magnesia (magnesium oxide, MgO) or magnesia spinel (MgO.Al$_2$O$_3$, MgAl$_2$O$_4$) or mixtures thereof. Magnesia may be present in the form of fused magnesia, sintered magnesia or mixtures thereof. Magnesia is preferably present in the first component in the form of sintered magnesia.

Insofar as both the first component and also the second component comprise magnesia and/or magnesia spinel, these substances are counted as part of the first component insofar as they are present in a grain size of 63 μm and over and as part of the second component insofar as they are present in a grain size of under 63 μm.

Relative to the total mass of the batch, the first component may be present in a mass fraction of at least 50% by mass. In addition, the first component may be present in the batch in a mass fraction of maximum 95% by mass, for example.

Again relative to the total mass of the batch, the second component may be present in the batch in a mass fraction of at least 5% by mass. In addition, the second component may be present in the batch in a mass fraction of maximum 50% by mass, for example.

Insofar as the second component comprises substances by means of which a binding phase comprising a MgSiAlON polytypoid can be formed during temperature application, the second component may be present in the batch in mass fractions of at least 5, 8, 10, 12 or 14% by mass. In addition, in this embodiment of the invention the second component may be present in the batch in mass fractions of maximum 50, 40, 30, 20, 18 or 16% by mass, for example. The aforementioned figures again relate to the total mass of the batch.

Insofar as the second component comprises substances through which a binding phase comprising a MgAlON polytypoid can be formed during temperature application, the second component may be present in the batch in mass fractions of at least 5, 10, 15, 20 or 23% by mass. In addition, in this embodiment of the invention the second component may be present in the batch in a mass fraction of maximum 50, 40, 30 or 27% by mass. The aforementioned figures again relate to the total mass of the batch.

Apart from the first component and the second component, the batch may exhibit additional components. These additional components may be substances, for example, which are contained in the substances of the first or second component as impurities and introduced into the batch by means thereof. Within a certain context, the presence of additional components of this kind is not detrimental to the success of the present invention. It may be provided, for example, that additional components of this kind are present in the batch in fractions of up to 10% by mass, so for example also in fractions of up to 7, 5, 3, 2 or 1% by mass. It has emerged with some substances, however, that they are detrimental to the success of the invention, in particular calcium-containing components, for example, particularly CaO, and chlorine-containing components. This means that CaO, for example, which may in particular be introduced into the batch by an impurity in the magnesia or the magnesia spinel, may be responsible for the formation of intermediate phases in the binding phase, for example unwanted intermediate phases in the form of glass phases or mayenite (Ca$_{12}$Al$_{14}$O$_{33}$). Insofar as chlorine-containing substances are present in the batch in addition to CaO as additional components, brearleyite (Ca$_{12}$Al$_{14}$O$_{32}$Cl$_2$) may be formed as a further unwanted intermediate phase.

So that the content of unwanted intermediate phases in the binding phase can be kept as low as possible, it may preferably be provided according to the invention that the content of CaO in the batch is under 5% by mass, so, for example, also under 3, 2, 1 or under 0.75% by mass relative to the total mass of the batch in each case.

With regard to the chlorine content, it may be provided that this content in the batch lies under 3% by mass, so for example also under 2 or under 1.5% by mass, again relative to the total mass of the batch in each case.

Further unwanted substances in the batch are chromium oxide and iron oxide. It may be provided according to the invention that the content of chromium oxide in the batch (given as Cr$_3$O$_4$) lies under 1% by mass, so for example also under 0.5 or under 0.3% by mass. The content of iron oxide in the batch (given as Fe$_2$O$_3$) may for example be under 2%, so for example also under 1.5 or under 1 or under 0.6% by mass. The aforementioned figures again relate to the total mass of the batch.

According to the invention, the batch in the present invention may be prepared such that the second component comprises substances by means of which a binding phase comprising an AlN polytypoid can be formed during temperature application. This binding phase forms a matrix in which substances of the first component are deposited or which surrounds substances of the first component.

The refractory material produced by means of the method according to the invention therefore forms a structure made up of grains or coarse grain comprising at least one of the following substances: magnesia or magnesia spinel, wherein these grains are surrounded by a binding phase which comprises an AlN polytypoid.

The fraction of grains relative to the refractory material may fall within the range of 95-50% by mass, for example, and the fraction of binding phase within the range of 5-50% by mass.

Insofar as the binding phase comprises a MgSiAlON polytypoid in the refractory material produced using the method according to the invention, the fraction of binding phase in the refractory material may amount to at least 5% by mass, for example, so also at least 8, 10, 12 or 14% by mass, for example. In addition, the fraction of binding phase in the refractory material may be maximum 50% by mass, for example, so for example also maximum 40, 30, 20, 18 or 16% by mass. The aforementioned figures relate to the total mass of the refractory material in each case.

Insofar as the binding phase of the refractory material produced using the method according to the invention comprises a MgAlON polytypoid, the fraction of binding phase in the refractory material may, for example, amount to at least 5% by mass, so also, for example, at least 10, 15, 20 or 23% by mass. In addition, the fraction of a binding phase of this kind in the refractory material is maximum 50% by mass, so for example also maximum 40, 30 or 27% by mass. The aforementioned figures relate to the total mass of the refractory material in each case.

The subject matter of the invention is also a refractory material which can be produced in particular using the method according to the invention described herein and which exhibits the properties described herein.

Insofar as the binding phase in the refractory material comprises a MgSiAlON polytypoid, the fraction of MgSiAlON polytypoid in the binding phase may fall within the range of 30-100% by mass, for example. The fraction of MgSiAlON polytypoid in the binding phase particularly preferably falls within the range of 60-95% by mass. The aforementioned figures relate to the total mass of the binding phase in each case.

Insofar as the binding phase in the refractory material comprises a MgAlON polytypoid, the fraction of MgAlON polytypoid in the binding phase may fall within the range of 10-100% by mass. The fraction of MgAlON polytypoid in the binding phase particularly preferably falls within the range of 25-80% by mass. The aforementioned figures relate to the total mass of the binding phase in each case.

In addition to an AlN polytypoid in the form of a MgSiAlON polytypoid or MgAlON polytypoid, the binding phase of the refractory material may in particular comprise at least one of the following substances or phases: magnesia, magnesia spinel, glass phase, mayenite or brearleyite. It may be provided that the binding phase exhibits no further substances apart from AlN polytypoid and possibly one or a plurality of the aforementioned substances or additional substances of this kind, where appropriate, in mass fractions of under 10% by mass, preferably under 5, 3, 2 or 1% by mass relative to the total mass of the binding phase in each case. The fraction of glass phase in the binding phase is preferably under 3% by mass, particularly preferably under 2% by mass or under 1% by mass. The fraction of mayenite and brearleyite is preferably under 3% by mass, particularly preferably under 2 or under 1% by mass in each case. The aforementioned figures relate to the total mass of the binding phase in each case.

The refractory materials produced according to the present invention are characterized by outstanding refractory properties. This is in particular also attributable to the fact that the grains of the first component are integrated in the binding phase substantially more firmly or else are sintered to one another more firmly via the binding phase than in a pressurelessly sintered material according to the state of the art. This means that in the case of the refractory materials according to the present invention, as the pressure increases, fewer and fewer cracks or gaps occur in the contact region between the binding phase and the grains of the first component until these almost disappear completely, for example at a pressure in the region of 30 MPa. From a pressure of roughly 10 MPa, the grains of the first component are largely in contact with the binding phase at the contact regions and as the pressure rises further, they are practically continuously in contact. Good integration of the grains of the first component into the binding phase is particularly attributable to the fact that the material has been exposed to pressure during firing according to the invention.

Comparisons between the refractory material according to the invention and refractory materials in which the binding phase likewise comprises an AlN polytypoid but which have not been exposed to pressure during firing, have shown that the properties of these latter materials are not satisfactory. Hence, the coarse grain is barely integrated into the matrix of the binding phase, or not integrated at all. There is no significant sintering of the coarse grain over the binding phase and wide cracks or gaps occur in the contact region between the binding phase and the coarse grain.

Compared with refractory materials of this kind according to the state of the art, the refractory materials produced according to the invention are distinguished by characteristically improved properties.

This means that the cold compression resistance of a refractory material according to the invention may be very high with a comparatively low modulus of elasticity at the same time. This produces outstanding strength properties for the refractory material with very low brittleness at the same time. In the case of refractory materials according to the state of the art based on magnesia, in particular sintered magnesia, or magnesia spinel, there is a routine correlation between the level of cold compression resistance and the level of the modulus of elasticity, so that refractory materials of this kind with a high cold compression resistance also exhibit a high level of brittleness at the same time due to a high modulus of elasticity. The cold compression resistance of the refractory material according to the present invention may, however, be very high and in particular over 40 MPa, so for example also over 80 MPa, 120 MPa or over 150 MPa. The modulus of elasticity of a refractory material according to the present invention may, however, be comparatively low and be under 80 GPa in particular, so for example also under 70 or under 60 GPa. In particular, the refractory materials according to the present invention may simultaneously exhibit the above values for cold compression resistance and modulus of elasticity.

The comparatively high cold compression resistance value and also the low porosity are characteristic of refractory materials produced using the method according to the invention and also of refractory materials according to the invention based on magnesia or magnesia spinel with a binding phase comprising an AlN polytypoid. Hence, the cold compression resistance values for the refractory materials according to the invention are routinely significantly higher than the corresponding values of pressurelessly sintered refractory materials according to the state of the art and the porosity values for the refractory materials according to the invention are routinely substantially lower than the corresponding values of pressurelessly sintered refractory materials according to the state of the art. Hence, the cold compression resistance of refractory materials based on magnesia or magnesia spinel with a binding phase comprising an AlN polytypoid which have been pressurelessly sintered according to the state of the art is routinely so low that said materials can only be used to a very limited extent. The cold compression resistance of refractory materials of this kind according to the state of the art is routinely under 40 MPa and, in particular, also routinely under 20 MPa. In contrast with this, the cold compression resistance for refractory materials produced by the method according to the state of the art, as indicated above, is routinely significantly higher than 40 MPa. In addition, the porosity of refractory materials of this kind according to the state of the art is constantly over 13% and routinely also over 15%. In contrast with this, the porosity of refractory materials produced using the method according to the invention is constantly under 15% and routinely also under 13%.

In addition, the refractory materials according to the present invention exhibit a high density and the aforementioned low porosity on account of good sintering or the good integration of grains of the first component into the binding phase, which results in good corrosion behaviour and, in particular, good oxidation resistance and infiltration resistance. Good oxidation resistance is also increased by the formation of an oxidic protective layer in products according to the invention and infiltration resistance by the low wettability of the nitrogen present. The oxidic protective layer is formed on a refractory material according to the invention, while said material is exposed to an oxidizing atmosphere during temperature application. This oxidic protective layer prevents or slows down further oxidation of the material. The oxidic protective layer in the case of a binding phase comprising a MgAlON polytypoid is made up of spinel and mayenite (or brearleyite) and in the case of a binding phase comprising a MgSiAlON polytypoid of spinel, monticellite and, particularly below the surface of the protective layer, of forsterite.

This means that the gross density of the refractory materials according to the invention may in particular be over 2.8 g/cm$^3$, so for example also over 2.9 or 2.95 or 3.0 g/cm$^3$.

In addition, the porosity of the refractory materials according to the invention may be under 15%, so for example also under 14 or 13%.

The cold compression resistance may in particular be determined according to ÖNORM EN 993-5:1998.

The modulus of elasticity may in particular be determined according to the figures in the following citation: G. Robben, B. Bollen, A. Brebels, J. van Humbeeck, O. van der Biest: "Impulse excitation apparatus to measure resonant frequencies, elastic module and internal friction at room and high temperature", Review of Scientific Instruments, Vol. 68, pp 4511-4515 (1997).

The gross density may in particular be determined according to ÖNORM EN 993-2:1995+A1:2003.

The porosity may in particular be determined according to ÖNORM EN 993-1:1995.

The refractory materials in the present invention may be used in principle for all applications in which refractory materials based on magnesia and/or magnesia spinel with good refractory properties are needed. For example, the refractory materials in the present invention can be used in steel production, in continuous casting plants or in industrial furnaces.

DETAILED DESCRIPTION

Figure 1:
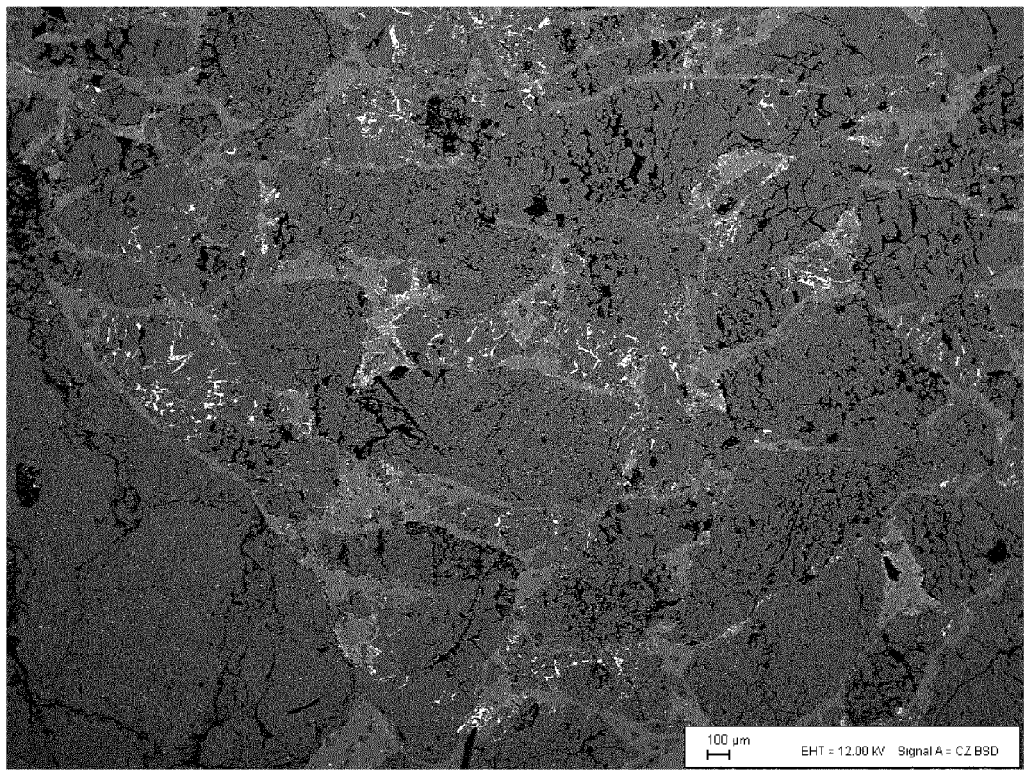
FIG. 1 shows a scanning electron microscopic image of a detail of a refractory material produced using the method according to the invention, wherein the binding phase comprises a MgSiAlON polytypoid.

Methods according to the invention and also refractory materials according to the invention are explained in greater detail below with the help of exemplary embodiments.

EXAMPLE 1

According to a first exemplary embodiment, a method according to the invention was implemented, wherein the second component comprised substances by means of which a binding phase comprising a MgSiAlON polytypoid can be formed when temperature is applied.

The first component of the batch comprised sintered magnesia with a grain size in the region of 63 μm to 5 mm. The magnesia used exhibited a purity of 98.4% by mass. In terms of impurities, the magnesia used exhibited CaO among other things with a mass fraction of 0.75% by mass relative to the magnesia used.

The second component comprised substances by means of which a binding phase comprising a MgSiAlON polytypoid can be formed during application of a temperature from around 1400° C. The second component comprised the following substances in this case: magnesia spinel, $Si_3N_4$, AlN, $Al_2O_3$, Si and MgO. The substances of the second component were present exclusively in a grain size of under 63 μm.

The mass fractions of the individual substances of the first and second components in the batch and also the grain fractions of the first components are indicated in the following Table 1.

TABLE 1

| Substance | | Fraction [% by mass] (relative to the total mass of the batch) |
|---|---|---|
| First component | MgO > 3-5 mm | 19.6 |
| | MgO > 1-3 mm | 25.8 |
| | MgO > 0.1-1 mm | 35.6 |
| | MgO 63-100 μm | 4.9 |
| Second component | $MgAl_2O_4$ | 4.9 |
| | $Si_3N_4$ | 0.4 |
| | AlN | 2.2 |
| | $Al_2O_3$ | 1.8 |
| | Si | 1.0 |
| | MgO | 3.8 |

A temporary binding agent in the form of isopropanol was added to the above batch, after which the batch was mixed. Green bodies were then formed from the batch by pressing. The green bodies were then dried at a temperature of roughly 100° C. The dried green bodies were each added to a graphite mould which is suitable for uniaxial hot-pressing.

The green bodies were then heated in a nitrogen atmosphere in a graphite furnace to a temperature of roughly 1620° C. and kept at this temperature for around 60 minutes.

While the green bodies were kept at this temperature, the substances of the second component formed a binding phase comprising a MgSiAlON polytypoid. At the same time, the green bodies were exposed to a pressure of 10 or 30 MPa through uniaxial hot-pressing in the graphite mould while this temperature was applied to them.

After cooling, refractory materials in the shape of formed products with the phases indicated in Table 2 were obtained.

TABLE 2

| Phase | | Fraction [% by mass] (relative to the total mass of the refractory material) |
|---|---|---|
| Coarse grain | MgO | 86.9 |
| Binding phase | Glass phase | 1.7 |
| | MgSiAlON | 7.7 |
| | Magnesia spinel | 3.7 |

The materials exhibit physical properties, as shown in the following Table 3. In this case, W0 denotes a comparative material which was produced according to this exemplary embodiment 1, with the difference that during temperature application it was not exposed to pressure according to the invention. Refractory materials produced according to the exemplary embodiment described above are designated W1 and W2, wherein the material W1 has been exposed to a pressure of 10 MPa during the temperature application, while the material according to W2 was exposed to a pressure of 30 MPa.

TABLE 3

| Property | W0 | W1 | W2 |
|---|---|---|---|
| Cold compression resistance [MPa] | 11.45 | 48.13 | 193.95 |
| Modulus of elasticity [GPa] | 1.7 | 18.82 | 42.77 |
| Porosity [%] | 21.06 | 12.25 | 4.96 |
| Gross density [g · cm$^{-3}$] | 2.72 | 3.04 | 3.30 |

EXAMPLE 2

According to a second exemplary embodiment, a method according to the invention was implemented, wherein the second component comprised substances through which a binding phase comprising a MgAlON polytypoid can be formed during temperature application.

The first component of the batch comprised sintered magnesia with a grain size in the region of 63 μm to 5 mm. In chemical terms, the magnesia used corresponded to the magnesia according to the exemplary embodiment 1.

The second component comprised substances by means of which a binding phase comprising a MgAlON polytypoid can be formed during application of a temperature from around 1400° C. The second component was made up of the following substances in this case: MgO, AlN and $Al_2O_3$. The substances of the second component were present exclusively in a grain size of under 63 μm.

The mass fractions of the individual substances of the first and second component in the batch and also the grain fractions of the first component are indicated in the following Table 4.

TABLE 4

| Substance | | Fraction [% by mass] (relative to the total mass of the batch) |
|---|---|---|
| First component | MgO > 3-5 mm | 15.0 |
| | MgO > 1-3 mm | 35.7 |
| | MgO 0.063-1 mm | 26.3 |
| Second component | AlN | 3.5 |
| | $Al_2O_3$ | 9.0 |
| | MgO | 10.5 |

The method for producing a refractory material from the batch according to Table 4 corresponded to the exemplary embodiment 1 described above, with the difference that the green bodies were kept at a temperature of 1650° C. for roughly 60 minutes, during which a binding phase comprising a MgAlON polytypoid was formed and during which it was exposed to pressure.

After cooling, refractory materials in the shape of formed products with the phases indicated in Table 5 were obtained.

TABLE 5

| Phase | | Fraction [% by mass] (relative to the total mass of the refractory material) |
|---|---|---|
| Coarse grain | MgO | 71.4 |
| Binding phase | MgAlON | 7.1 |
| | Magnesia spinel | 13.3 |
| | MgO | 6.8 |
| | Mayenite | 1.4 |

The materials exhibit physical properties, as shown in the following Table 6. In this case, W0 again denotes a comparative material, while the material W3 according to the invention was exposed to a pressure of 10 MPa and the material W4 according to the invention to a pressure of 30 MPa.

TABLE 6

| Property | W0 | W3 | W4 |
|---|---|---|---|
| Cold compression resistance [MPa] | 11.45 | 138.7 | 321.28 |
| Modulus of elasticity [GPa] | 1.7 | 33.9 | 56.09 |
| Porosity [%] | 21.06 | 10.11 | 3.28 |
| Gross density [g · cm$^{-3}$] | 2.72 | 3.14 | 3.38 |

FIG. 1 shows a scanning electron microscopic image of a detail of a refractory material produced using the method according to the invention, wherein the binding phase comprises a MgSiAlON polytypoid.

Figure 2:
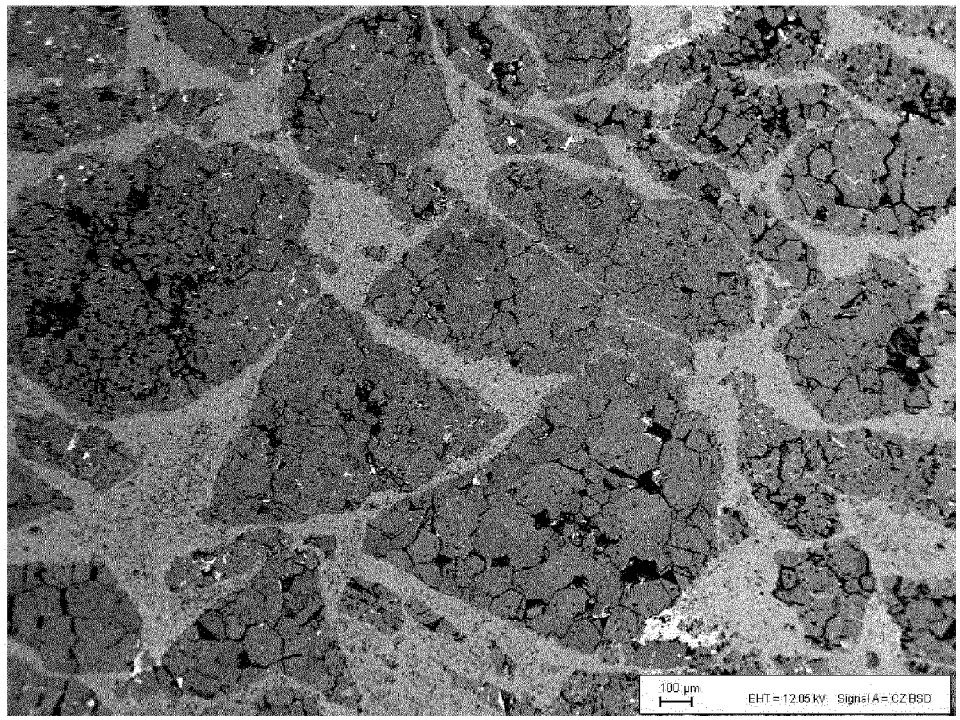
FIG. 2 shows a scanning electron microscopic image of a detail of a refractory material produced using the method according to the invention, the binding phase whereof comprises a MgAlON polytypoid.

FIG. 2 shows a scanning electron microscopic image of a detail of a refractory material produced using the method according to the invention, the binding phase whereof comprises a MgAlON polytypoid.

The black bar bottom right in the images according to FIGS. 1 and 2 corresponds to a length of 100 μm.

Darker grains of magnesia embedded in the lighter binding phase can be identified in the images. It is easy to see here that the grains are in contact with the binding phase without a space and are firmly sintered to one another over said binding phase. The refractory materials according to FIGS. 1 and 2 were sintered at a pressure of around 30 MPa.

Figure 3:
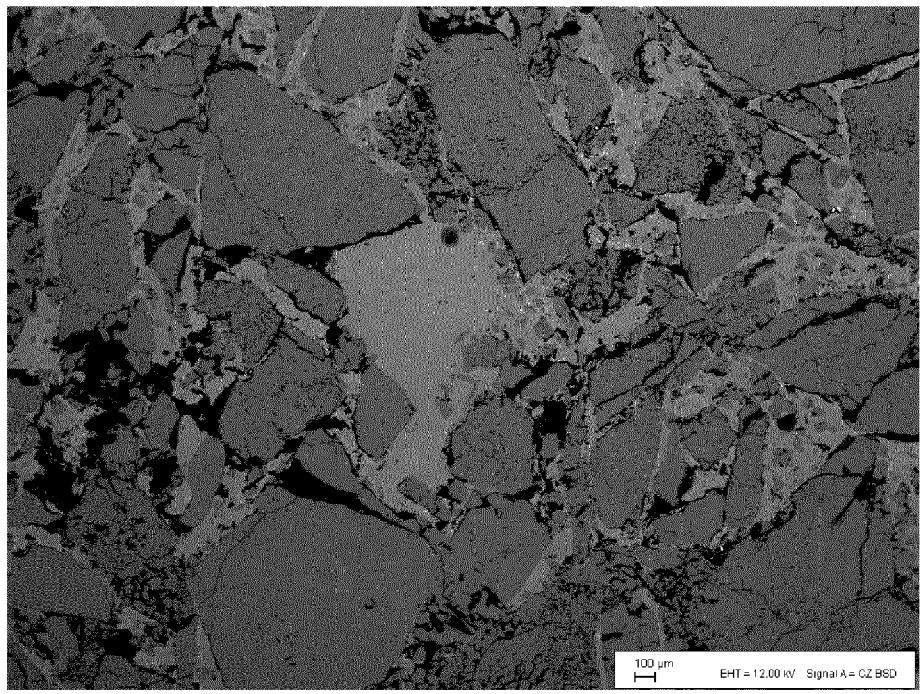
FIG. 3 shows a scanning electron microscopic image of a detail of a refractory material produced using the method according to the invention, the binding phase whereof comprises a MgSiAlON polytypoid and which was sintered according to the invention at a pressure of around 10 MPa.

FIG. 3 is a scanning electron microscopic image of a detail of a refractory material produced using the method according to the invention, the binding phase whereof comprises a MgSiAlON polytypoid and which was sintered according to the invention at a pressure of around 10 MPa. The darker grains of magnesia are again embedded in the lighter binding phase, wherein very small pore spaces can be identified in isolation around the grains. The black bar bottom right in the image corresponds to a length of 100 µm.

Figure 4:
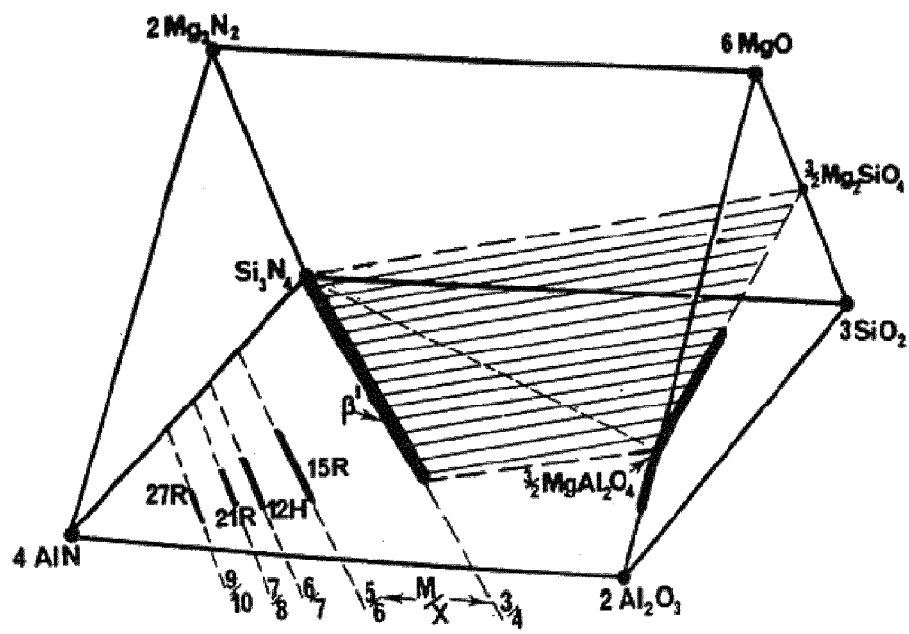
FIG. 4 shows a MgSiAlON polytypoid phase diagram for the phases MgO, $Mg_3N_2$, AlN, $Al_2O_3$, $SiO_2$ and $Si_3N_4$.

Depicted in FIG. 4 is a MgSiAlON polytypoid phase diagram for the phases MgO, $Mg_2N_2$, AlN, $Al_2O_3$, $SiO_2$ and $Si_3N_4$. The MgSiAlON polytypoids are highlighted by thick black lines.

Figure 5:
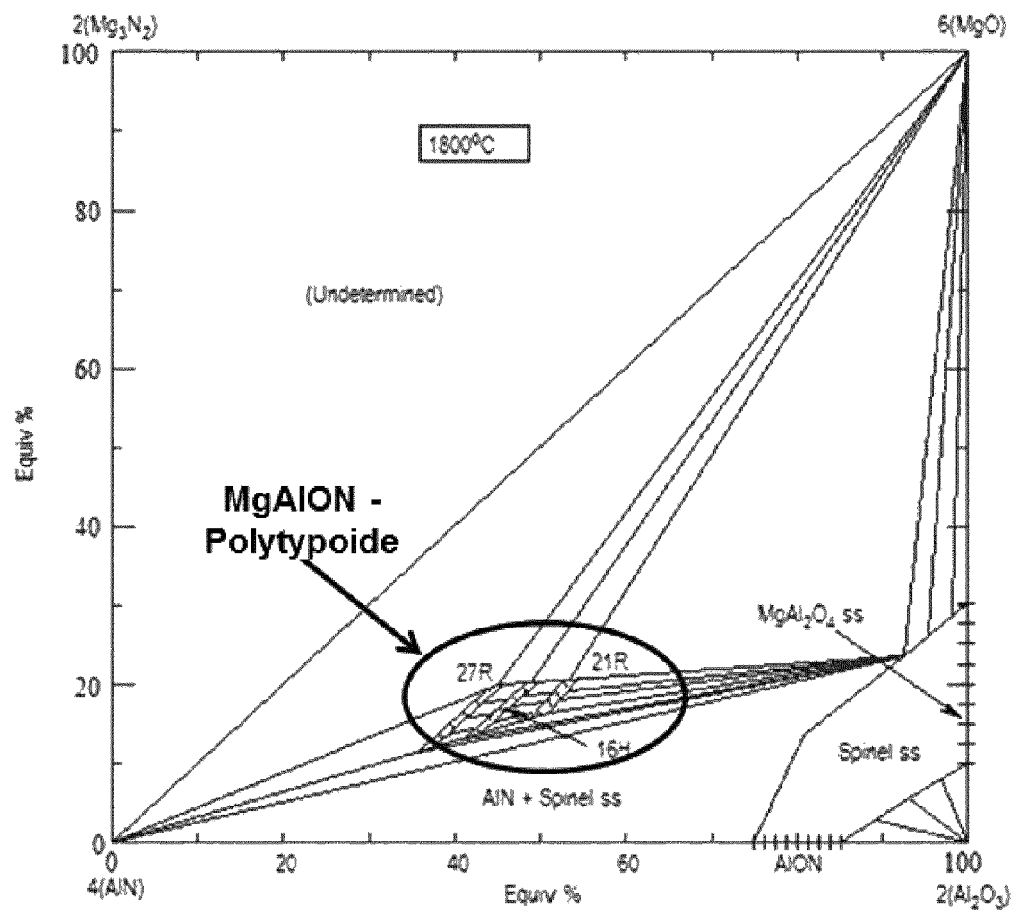
FIG. 5 shows a MgAlON polytypoid phase diagram for the phases MgO, $Mg_3N_2$, AlN and $Al_2O_3$.

FIG. 5 shows a MgAlON polytypoid phase diagram for the phases MgO, $Mg_3N_2$, AlN and $Al_2O_3$. The position of the MgAlON polytypoids therein is indicated.

The invention claimed is:

1. A method for producing a refractory material based on magnesia or magnesia spinel with the following steps:
   1.1 provision of a batch comprising
      1.1.1 a first component made of at least one of the following materials:
      magnesia or magnesia spinel;
      1.1.2 a second component comprising substances by means of which a binding phase comprising an AlN polytypoid can be formed when temperature is applied;
      1.1.3 wherein the mean grain size of the first component is greater than the mean grain size of the second component;
   1.2 application of temperature to the batch within a temperature range in which the second component forms a binding phase comprising an AlN polytypoid;
   1.3 the batch is exposed to pressure during the application of temperature in this temperature range.

2. The method according to claim 1, wherein the batch is exposed to a pressure of over 1 MPa.

3. The method according to claim 1, wherein the batch is exposed to a temperature of at least 1200° C.

4. The method according to claim 1, wherein the second component comprises substances by means of which a binding phase can be formed when temperature is applied, which binding phase comprises one of the following AlN polytypoids: MgAlON polytypoid or MgSiAlON—AlN polytypoid.

5. The method according to claim 1, wherein the components of the batch exhibit the following fractions by mass, relative to the total mass of the batch:
   First component: 95 to 50% by mass;
   Second component: 5 to 50% by mass.

6. The method according to claim 1, wherein at least 90% by mass of the second component exhibits a grain size of under 63 µm.

7. The method according to claim 1, wherein at least 90% by mass of the first component exhibits a grain size of over 63 µm.

8. A refractory material based on magnesia or magnesia spinel produced by the following steps:
   producing a batch comprising,
      a first component made of at least one of the following materials:
      magnesia or magnesia spinel;
      a second component comprising substances by means of which a binding phase comprising an AlN polytypoid can be formed when temperature is applied;
   applying a temperature to the batch within a temperature range in which the second component forms a binding phase comprising an AlN polytypoid; wherein the mean grain size of the first component is greater than the mean grain size of the second component;
   exposing the batch to pressure during the application of temperature in the temperature range;
   wherein the structure whereof is made up of grains comprising at least one of the following substances: magnesia or magnesia spinel,
   wherein the grains are surrounded by a binding phase which comprises an AlN polytypoid.

9. The refractory material according to claim 8 having a mass fraction of grains within the range of 95-50% by mass and a fraction of binding phase within the range of 5-50% by mass relative to the material in each case.

10. The refractory material according to claim 8 having a fraction of MgSiAlON polytypoid in the binding phase within the range of 30-100% by mass or having a fraction of MgAlON polytypoid in the binding phase within the range of 10-100% by mass, relative to the binding phase in each case.

11. The refractory material according to claim 8 having a cold compression resistance of at least 40 MPa.

12. The refractory material according to claim 8 having a modulus of elasticity of no more than 80 GPa.

13. The refractory material according to claim 8 having a gross density of at least 2.80 g/cm$^3$.

14. The refractory material according to claim 8 having an open porosity of no more than 20%.

* * * * *